(12) United States Patent
Jessenig et al.

(10) Patent No.: US 9,673,703 B2
(45) Date of Patent: Jun. 6, 2017

(54) BIDIRECTIONAL TEMPERATURE COMMUNICATION BETWEEN CONTROLLER AND CONVERTER FOR MULTIPLE PHASE BUCK CONVERTERS

(71) Applicant: ams AG, Unterpremstaetten (AT)

(72) Inventors: Thomas Jessenig, Graz (AT); Peter Kammerlander, Graz (AT)

(73) Assignee: AMS AG, Unterpremstaetten (AT)

( * ) Notice: Subject to any disclaimer, the term of this patent is extended or adjusted under 35 U.S.C. 154(b) by 0 days.

(21) Appl. No.: 14/409,746

(22) PCT Filed: Jun. 19, 2013

(86) PCT No.: PCT/EP2013/062799
§ 371 (c)(1),
(2) Date: Dec. 19, 2014

(87) PCT Pub. No.: WO2014/001180
PCT Pub. Date: Jan. 3, 2014

(65) Prior Publication Data
US 2015/0326122 A1      Nov. 12, 2015

(30) Foreign Application Priority Data

Jun. 28, 2012   (DE) ................. 10 2012 105 694

(51) Int. Cl.
*H02M 3/158*    (2006.01)
*H02M 3/155*    (2006.01)
*H02M 7/00*     (2006.01)

(52) U.S. Cl.
CPC ......... *H02M 3/158* (2013.01); *H02M 3/1584* (2013.01); *H02M 3/155* (2013.01); *H02M 7/003* (2013.01)

(58) Field of Classification Search
CPC ....... H02M 3/1584; H02M 2003/1586; H02M 3/156; H02M 3/158; H04B 3/50
See application file for complete search history.

(56) References Cited

U.S. PATENT DOCUMENTS

| 5,313,381 A | 5/1994 | Balakrishnan |
|---|---|---|
| 6,965,502 B2 | 11/2005 | Duffy et al. |

(Continued)

FOREIGN PATENT DOCUMENTS

| DE | 102007002342 B3 | 10/2008 |
|---|---|---|
| DE | 102011008251 A1 | 7/2011 |

(Continued)

OTHER PUBLICATIONS

AS3658 Datasheet—"Power and Audio Management Unit for Portable Devices"; <http://ams.com/eng/Products/Power-Management/Power-Management-Units/AS3658>; Revision 1v13 <http://www.austriamicrosystems.com>, 2007, pp. 1-157.

*Primary Examiner* — Fred E Finch, III
*Assistant Examiner* — Peter Novak
(74) *Attorney, Agent, or Firm* — McDermott Will & Emery LLP (57) ABSTRACT

A converter arrangement, in particular a switched DC/DC converter arrangement, comprises a control die and a converter die. The control die comprises a control logic for generating a control signal and a control output for controlling the converter die by means of the control signal. The converter die comprises at least one converter that is designed for converting an input signal into an output signal in dependence on the control signal, wherein the control signal can be received at a control input. A single-line interface connects the control output to the control input.

15 Claims, 8 Drawing Sheets

(56) References Cited

U.S. PATENT DOCUMENTS

| | | | |
|---|---|---|---|
| 7,230,406 B2 * | 6/2007 | Huang | H02M 3/1584 323/222 |
| 7,584,371 B2 * | 9/2009 | Zhang | G05B 19/0423 323/318 |
| 2003/0006650 A1 * | 1/2003 | Tang | G06F 1/26 307/43 |
| 2006/0001408 A1 * | 1/2006 | Southwell | H02M 3/1584 323/282 |
| 2006/0227028 A1 | 10/2006 | Balogh et al. | |
| 2008/0309300 A1 | 12/2008 | Liu et al. | |
| 2012/0086416 A1 | 4/2012 | Kudo et al. | |
| 2014/0266111 A1 * | 9/2014 | Lee | H02M 3/1584 323/282 |
| 2015/0303808 A1 * | 10/2015 | Ryotaro | H02M 3/158 323/271 |

FOREIGN PATENT DOCUMENTS

| | | |
|---|---|---|
| EP | 2369727 A2 | 9/2011 |
| WO | 2009/051708 A1 | 4/2009 |

\* cited by examiner

BIDIRECTIONAL TEMPERATURE COMMUNICATION BETWEEN CONTROLLER AND CONVERTER FOR MULTIPLE PHASE BUCK CONVERTERS

The present invention pertains to a converter arrangement, in particular a switched DC/DC converter arrangement. The invention furthermore pertains to a method for operating a converter arrangement, particularly for operating a switched DC/DC converter arrangement.

BACKGROUND OF THE INVENTION

The energy management for integrated circuits in customer-specific applications is increasingly faced with the task of being able to satisfy a continuously rising power demand. In particular, modern processors require high currents that must be made available via power supply rails of several DC/DC down converters. Accordingly, the control circuits (power management units) required for this purpose are becoming more and more complex, such that the expenditures for making available high currents increase accordingly. Limiting factors in this respect are, for example, the size of the semiconductor substrate used, the number of pins and terminals, thermal restrictions due to power losses, as well as restrictions due to the current conduction and the limited soldering space.

In the prior art, it is known to utilize external transistors in order to reduce the complexity of integrated circuits for energy management and to simultaneously make available high currents. In this way, the supply path (power path) can be separated from the central control unit (power management integrated circuit or PMIC). Although the utilization of external transistors allows a simpler design of the PMICs, this arrangement has a number of disadvantages. For example, multiple terminals (pins) are required for implementing a conventional current mode DC/DC converter (current mode). Furthermore, currently available external transistors only have a low switching frequency and therefore slow rise and fall times. This makes it necessary to utilize coils with higher impedance that further reduce the efficiency of the DC/DC converter. This may be particularly critical in applications with processors that require a plurality of power supplies. There is a need in the art for a converter arrangement with reduced complexity, as well as the capability of making available high currents.

SUMMARY OF THE INVENTION

According to an embodiment of the invention, a converter arrangement comprises a control die and a converter die. The converter arrangement may be realized, in particular, in the form of a switched DC/DC converter arrangement.

The control die furthermore comprises a control logic in order to generate a control signal. The converter die comprises at least one DC/DC converter that is designed for converting an input signal into an output signal in dependence on the control signal. The control die and the converter die are connected by means of a single-line interface. This single-line interface connects the control output of the control die to the control input of the converter die.

The control die or the control logic of the control die respectively generates the control signal in order to control the converter die with this control signal via the control output. For example, the control signal is used for adjusting a duty factor (duty cycle) of the converter die. The at least one DC/DC converter transforms the input signal into the output signal in dependence on the control signal.

In this case, the term "single-line interface" refers to an interface that is designed for transmitting a signal in two different directions. In the present instance, the control signal generated by the control die is transmitted in a first transmitting direction from the control output of the control die to the control input of the converter die by means of the single-line interface. Information or generally signals can likewise be transmitted in a second transmitting direction from the control input of the converter die to the control output of the control die. The transmission in both directions takes place via one individual line.

Furthermore, the term module or die refers to a semiconductor chip or "die," wherein the latter refers in the field of integrated circuits to a semiconductor material that comprises a functional integrated circuit.

The proposed implementation of separate control and converter dies allows a less complex design of the entire converter arrangement and is simultaneously capable of making high electric currents available. For example, the converter die may comprise one or more DC/DC converters, for example, with corresponding DC/DC transistors, as well as corresponding drivers for these transistors, current measuring devices and zero comparators, in a single structure that is realized separately from the control die. Other components that are typically used in a converter arrangement are included in the control logic. For example, the control logic comprises a feedback path, a control path, a pulse-width modulator and a voltage selector. These components are likewise integrated into a separate module.

In comparison with solutions known from the prior art that utilize external transistors, the proposed solution has a reduced number of terminals (pins). External terminals for such transistors are not required. Since it is possible to forego external transistors, the switching frequency of the present arrangement is improved in comparison with these solutions. The switching frequency can be increased, in particular, for switched DC/DC converters such that lower inductances can be used with the converter arrangement. This also has the advantage that smaller module sizes and consequently lower production costs can be realized. The efficiency of the converter arrangement can ultimately also be increased due to the higher switching frequencies and the option of using lower inductances.

According to another embodiment of the invention, the single-line interface is designed for bidirectional communication between the control output and the control input. This bidirectional communication allows the transmission of signals in the above-defined first and second transmitting directions. The control signal may be transmitted from the control die to the converter die in order to respectively adjust a duty factor or duty cycle of the converter die. Information on a coil current and/or a temperature of the module or the coil can be transmitted in the second transmitting direction. This makes it possible, for example, to detect excessively high temperatures. It is generally possible to simultaneously transmit signals in both transmitting directions. However, typically the transmission initially takes place in one direction and is followed by a transmission in the other direction.

According to another embodiment of the invention, the bidirectional communication is designed for the transmission of the control signal from the control output to the control input, as well as for the reception of a current signal that is transmitted from the control input to the control output. In this case, the current signal depends on the current flowing through a coil that can be connected to the at least one DC/DC converter.

In conventional converter arrangements, at least one coil is externally connected to the integrated circuit. However, it is also possible to integrate the coil into the module structure.

The current flowing through the inductance or coil represents a potential control parameter that is dependent on the operating state of the converter itself. The transmission of the corresponding current signal with the aid of the bidirectional single-line interface can be used for controlling the converter arrangement. In this way, the single-line interface is used for controlling the converter die in one transmitting direction and for receiving feedback for control purposes in the other transmitting direction.

According to another embodiment of the invention, the control logic of the control die generates the control signal in dependence on the current signal.

The current signal is a measure for the current flowing through the connected inductance or coil and can be used as control parameter. For example, the current signal indicates the electric current that flows through the coil and, for example, should remain within certain limits. The control makes it possible for the current signal to remain within predefined threshold values. As soon as the current deviates from these ranges, the control can intervene by correspondingly adapting the control signal with the aid of the control logic.

According to another embodiment of the invention, the control logic comprises a feedback or return input that is connected to a feedback output (or return output) of the converter die.

The converter die generates a feedback or return signal in dependence on the output signal of the (voltage) conversion of the converter die. The control signal generated by the control logic also depends on the feedback signal. The feedback signal may indicate the level of the output signal. For example, the output signal corresponds to the output voltage generated by the at least one DC/DC converter. The feedback of this output signal makes it possible to adjust the control signal accordingly, wherein this may be realized, for example, by adapting the duty factor or the "duty cycle" of the at least one DC/DC converter.

According to another embodiment of the invention, the control logic comprises a comparator that is coupled to the feedback input.

The comparator is designed for generating a comparison signal by comparing the current signal and the feedback signal. In this way, two control variables are used for generating the control signal. On the one hand, the control is respectively realized by means of the single-line interface or the transmission of the current signal that indicates the current flowing through the connected inductance or coil. On the other hand, the control is realized by means of the feedback or return signal that is dependent on the output signal. For example, the feedback signal indicates the output voltage of the at least one DC/DC converter and is accordingly used for adjusting the control signal.

According to another embodiment of the invention, the control logic comprises a modulator for modulating the control signal based on a pulse-width modulation. In this case, the modulation depends on the comparison signal of the comparator. Furthermore, the thusly pulse-width modulated control signal defines the duty factor or "duty cycle" of the at least one DC/DC converter. This embodiment with an auxiliary modulation is particularly advantageous when a switched "current mode" converter arrangement is used.

According to another embodiment of the invention, the converter die comprises the at least one DC/DC converter that also features switches. Potential switches include, for example, "power switches." An additionally provided converter control logic is connected to the control input, as well as connected to the switches via driver stages. Furthermore, a provided power source is connected to the control input and coupled to a current meter.

The switches are likewise integrated into the same semiconductor chip together with the converter control logic, i.e. the driver stages are connected to the switches. The current source and the current meter are likewise integrated into the same semiconductor structure.

At the control input, the converter die receives the control signal that consequently is applied to the driver stages. The driver stages are designed for driving the switches in accordance with the control signal. The current meter is used for measuring the current signal that indicates the current flowing through the connected coil. The current signal is tapped by this current meter and made available at the control input by means of the current source. In this way, the current signal can be transmitted to the control output of the control die by means of the single-line interface.

According to another embodiment of the invention, the control die comprises a temperature input. In addition, the converter die comprises a temperature output. A second single-line interface is provided and connects the temperature input to the temperature output.

According to another embodiment of the invention, the second single-line interface is designed for bidirectional communication between the temperature input and the temperature output.

Similar to the above-discussed first single-line interface, the second single-line interface is also designed for transmitting signals in two different transmitting directions—in this case from the temperature input to the temperature output and vice versa.

According to another embodiment of the invention, the converter die features means for generating a temperature signal in dependence on the temperature of the converter die. This temperature signal is made available at the temperature output and transmitted to the temperature input of the control die by means of the second single-line interface. In this way, temperature information that indicates, for example, the temperature of the semiconductor chip or the coil can be made available to the control die such that this temperature information can be taken into consideration in making available the control signal.

According to another embodiment of the invention, the bidirectional communication is designed for transmitting the temperature signal from the temperature output to the temperature input, as well as for receiving a configuration signal from the temperature input at the temperature output.

According to another embodiment of the invention, the control logic switches the converter die on or off and/or adjusts a BIAS current at the converter die in dependence on the configuration signal. In other words, the second single-line interface can be utilized similarly to the first single-line interface. This means that it is possible to transmit and receive signals, in this case for example the temperature signal and the configuration signal, in two transmitting directions by means of the second single-line interface.

According to another embodiment of the invention, the converter die comprises a plurality of control logics that respectively feature corresponding control outputs. In addition, the converter die comprises a plurality of converters and corresponding control inputs.

Each control logic can control a corresponding converter by means of respective control signals. For this purpose, the converter die comprises one or more DC/DC converters that are referred to as phases. For example, the converters are integrated into one common semiconductor body or distributed over different separate components.

The proposed design allows a flexible implementation of the converter arrangement for an effective power management. The number of individual phases can largely be chosen arbitrarily and adapted to the corresponding task. High electric currents for several voltage supplies can be realized.

According to another embodiment of the invention, the plurality of control logics is integrated into a common semiconductor body. The plurality of converters is integrated into another common semiconductor body.

According to another embodiment of the invention, the plurality of control logics respectively use or share a common return or feedback input. This is connected to a feedback output of the plurality of converters. The feedback or return path that connects the feedback input to the comparator can be identical for all or at least some of the control logics.

According to an embodiment of the invention, a method for operating a converter arrangement, particularly for operating a switched voltage converter, initially comprises the generation of a control signal by means of a control logic in a control die in order to control a converter die by means of the control signal. In addition, the control signal is transmitted by means of a first single-line interface that connects the control output of the control die to a control input of the converter die. The control signal is received at the control input of the converter die, and at least one DC/DC converter of the converter die converts an input signal into an output signal in dependence on the control signal.

The proposed method respectively utilizes separate or separated control and converter dies and in this way allows a simpler design and therefore a simpler operation of the entire converter arrangement. This makes it possible to make available high electric currents. In comparison with solutions known from the prior art, it is possible to forego the utilization of external transistors and therefore to reduce the number of external terminals (pins), because no external transistors have to be connected. The switching frequency of the converter arrangement is thereby increased and makes it possible to utilize lower inductances that are typically used with the arrangement. This also provides the advantage of reduced module sizes and consequently lower production costs. The faster switching frequency and the utilization of lower inductances ultimately make it possible to improve the efficiency of the entire converter arrangement.

BRIEF DESCRIPTION OF THE DRAWINGS

Several embodiment examples of the invention are described in greater detail below with reference to the figures. The description of circuit components or modules that correspond with respect to their function is not repeated in each of the following figures.

In these figures.

DETAILED DESCRIPTION

Figure 1:
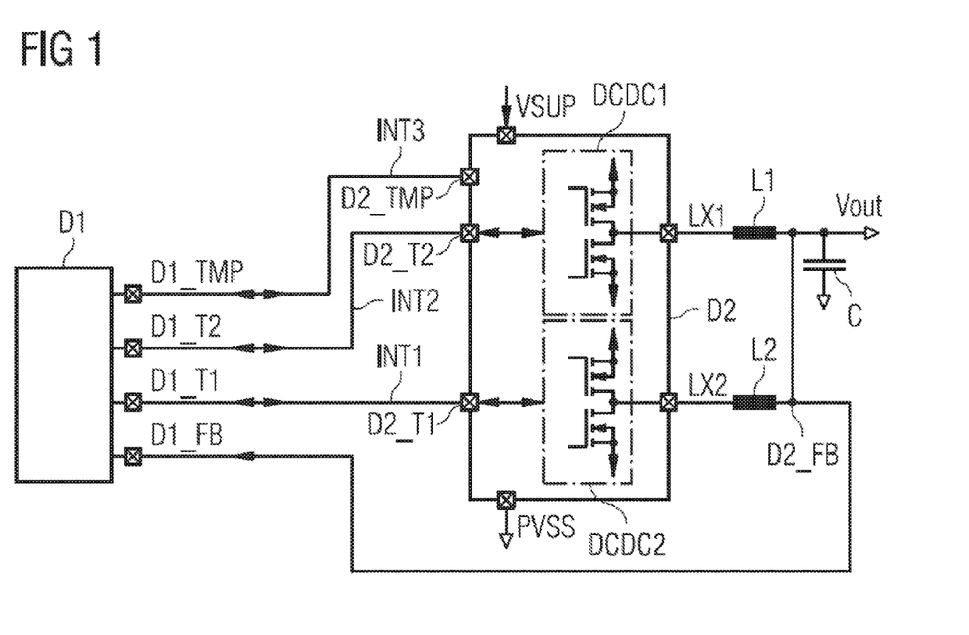
FIG. 1 shows an embodiment example of a converter arrangement according to the proposed principle.

FIG. 1 shows an embodiment example of a converter arrangement according to the proposed principle. The converter arrangement comprises two separate components, namely a control die D1 and a converter die D2. Both modules are respectively integrated into different semiconductor blocks. The illustration merely shows function blocks that are discussed in greater detail below with reference to the other figures. In the proposed arrangement, the converter die comprises at least one DC/DC converter, wherein a first and a second DC/DC converter DCDC1, DCDC2 are illustrated in FIG. 1. These voltage converters respectively comprise transistors SW1, SW2, means for driving these transistors, current measuring means and (optionally) a zero comparator. The control die or main module comprises a control logic for controlling the DC/DC converters of the converter die D2. Other components include a return or feedback path, a control path, a pulse-width modulator and voltage selection options or other components.

The control die D1 and the converter die D2 are connected to one another via different control lines. In this example, the control die D1 comprises two control outputs D1_T1, D1_T2 that are respectively connected to corresponding control inputs D2_T1, D2_T2 of the converter die D2 by means of a single-line interface INT1, INT2. In addition, the control die D1 comprises a feedback input D1_FB that is connected to a feedback output D2_FB of the converter die D2. The control die ultimately also comprises a temperature input D1_TMP that is connected to a corresponding temperature output D2_TMP of the converter die D2.

The converter die D2 features a supply input, at which a supply voltage Vsup can be supplied, as well as an additional input PVSS for supplying a reference voltage. The control inputs D2_T1, D2_T2 are connected to a first and a second DC/DC converter. The first and the second DC/DC converters are connected to corresponding inductance terminals LX1, LX2. These inductance terminals are connected to a first and a second coil L1, L2. The first coil and the second coil L1, L2 are connected to one another and also connected to an output Vout of the converter die D2 and a capacitor C. At the connection node between the first and the second coil L1, L2, a feedback output D2_FB is connected to the feedback input D1_FB of the control die D1.

The converter arrangement illustrated in this figure features a voltage feedback for determining the feedback signal FB of the converter die D2 (in this case in dependence on an output voltage Vout). The converter arrangement additionally features a control path for determining a current signal I_sense that represents a measure for the current flowing in the first and the second coil L1, L2. In order to implement these feedbacks, the control input and the control output are connected by means of the single-line interfaces INT1, INT2. These interfaces are designed for bidirectional communication and can transmit the control signal PWM from the control die D1 to the converter die D2, as well as transmit the measured current signal I_sense, which indicates the inductance current (common sense) received at the control die D1 due to the transmission from the converter die D2, in the opposite transmitting direction.

The voltage feedback is implemented by means of the transmission of the feedback signal FB in dependence on the output voltage Vout from the converter die D2 to the control die D1 and only takes place in one direction.

Furthermore, the connection between the temperature input and the temperature output D1_TMP, D2_TMP may also be realized based on bidirectional communication. For this purpose, the connection between the temperature input and the temperature output is likewise produced by means of a single-line interface INT3. This interface can be used for receiving a temperature signal TEMP from the converter die D2, as well as for transmitting a configuration signal SET from the control die D2 to the converter die D2 in another transmitting direction and for switching the converter die D2 on or off and/or making available a bias current at the converter die D2 in dependence on this signal.

The single-line interfaces INT1, INT2 represent a simplified way for controlling the DC/DC converters of the converter die D2 in one transmitting direction and make it possible to receive feedback information such as, for example, the current measured at the converter die D2 in another transmitting direction. The implementation of the converter arrangement allows a design with less complexity and a reduced structural size. The number of required terminals is fewer than in solutions known from the prior art. The influence of thermal factors is reduced because the dissipation of power essentially concerns only one of the two modules. The implementation is furthermore advantageous for a simpler power supply.

Figure 2:
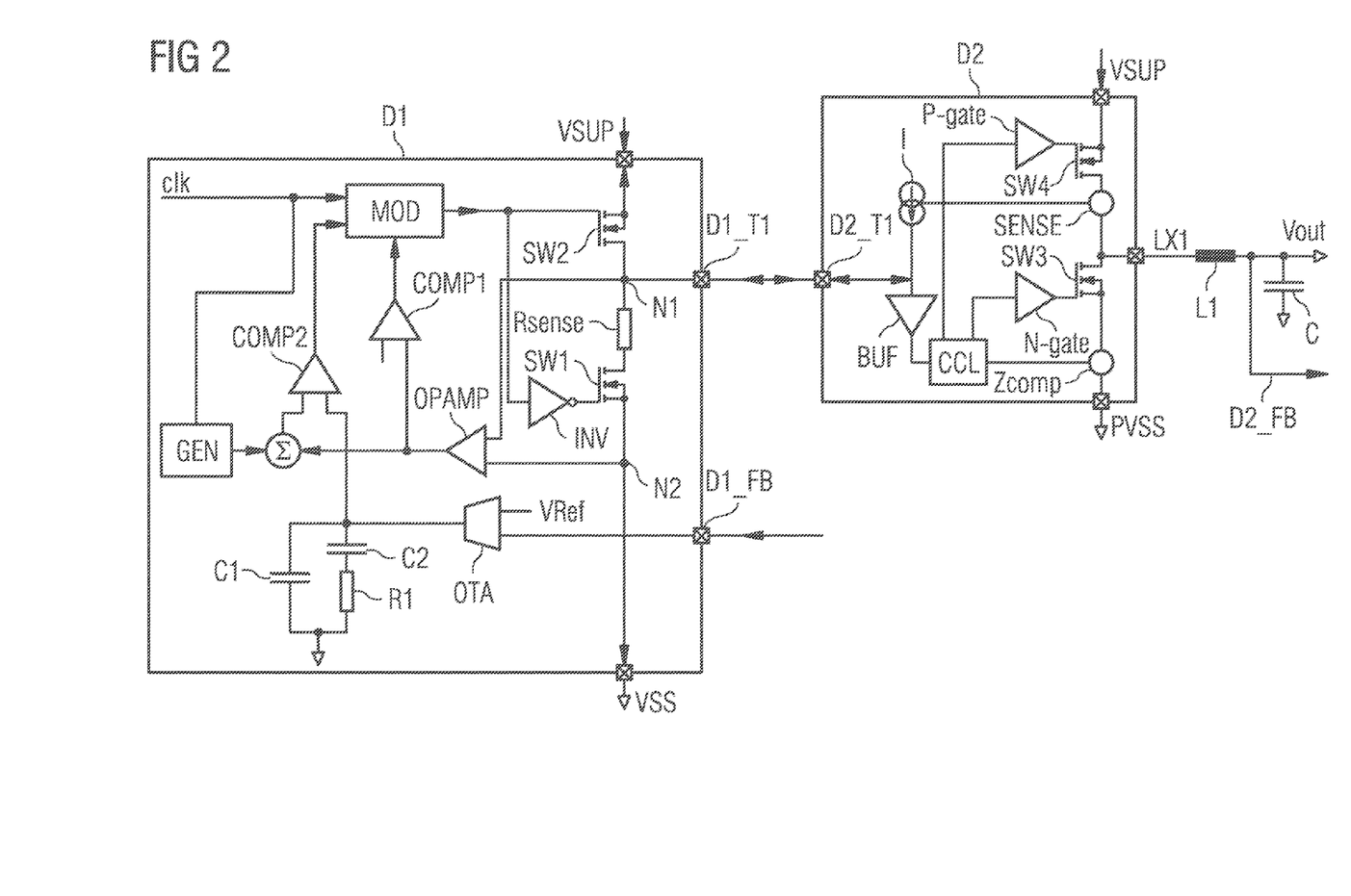
FIG. 2 shows another embodiment example of a converter arrangement according to the proposed principle.

FIG. 2 shows a converter arrangement according to the proposed principle in greater detail. The control die D1 comprises a control logic that features at least three additional components: a pulse-width modulator MOD, a return or feedback path and a control path. The input side of the pulse-width modulator MOD is connected to a (not-shown) clock generator and the output of the second comparator COMP2. A saw-tooth generator GEN is also connected to the clock generator. An output of the pulse-width modulator MOD is connected to a control side of a first switch SW1, as well as to a control side of a second switch SW2 via an inverter INV. The first and the second switch SW1, SW2 are connected to one another with their respective load sides by means of a first node N1 and a precision resistor Rsense. In addition, the first switch SW1 is coupled to a supply terminal VSUP with its other load side. The second switch SW2 is coupled to an additional supply terminal VSS via a second node N2 with its other load side.

The control path comprises an operational amplifier OPAMP that is connected to the first and the second nodes N1, N2 with its input side. The first node N1 is additionally coupled to the control output D1_T1. An output side of the operational amplifier OPAMP is connected to a first comparator COMP1, as well as to an input of a second comparator COMP2 via a summing unit Z. The first comparator COMP1 is an optional component that is coupled to the pulse-width modulator MOD with its output side.

The return or feedback path comprises a transconductance amplifier (operational transconductance amplifier) OTA that is connected to the feedback input D1_F1 with an input side. A reference voltage VREF is supplied to another input side. An output side of the transconductance amplifier OTA is connected to a grounded parallel circuit that comprises a first capacitor C1 on one branch and a second capacitor, as well as a first resistor R1, on another branch. The output side of the operational amplifier OPAMP is also connected to another input of the second comparator COMP2. The saw-tooth generator GEN is ultimately coupled to the second comparator COMP2 via the summing unit Z.

The converter die D2 comprises at least one DC/DC converter DCDC1 with at least two interconnected switches SW3, SW4. The switches are respectively coupled to a converter control logic CCL via a driver stage, wherein the driver stage comprises a p-gate and an n-gate. One of the switches SW3 is particularly connected to the converter control logic CCL with the n-gate and the other switch SW4 is connected to the converter control logic CCL with the p-gate. The switches SW3, SW4 are connected in series with their corresponding load sides and with a current meter SENSE. In addition, the switches SW3, SW4 are supplied via the supply terminals VSUP, PVSS.

The interconnected switches are additionally connected to an inductance terminal LX1. The inductance terminal LX1 may be connected to an external coil L1 and grounded by means of a capacitor C. In addition, a connection node that connects the coil L1 and the capacitor C forms a feedback output D2_FB and is connected to the feedback input D1_FB.

The converter die D2 optionally comprises a zero comparator Zcomp that is connected between one of the switches (in this case SW3) and the corresponding supply input PVSS.

The embodiment illustrated in FIG. 2 represents a current mode DC/DC converter (current mode DC/DC converter). The arrangement may be operated based on the principle of switched DC/DC converters.

Accordingly, the converter utilizes a feedback signal FB that indicates the output voltage Vout and is made available by the DC/DC converter DCDC1. The converter utilizes a current signal I_sense that is dependent on the current flowing through the coil L1 via the control path. These two signals are fed to the second comparator COMP2. In this way, the control signal PWM is generated by means of the pulse-width modulator MOD in dependence on a comparison signal of the second comparator COMP2. The control signal PWM then serves for controlling the converter die D2, for example, in that it adjusts a duty factor or duty cycle for the DC/DC converter DCDC1. In other words, the control die D1 utilizes a feedback voltage, as well as current information on the coil L1, in order to generate the control signal PWM.

The mode of operation of the control die D1 is described in greater detail below. The proposed mode of operation can be derived from the current mode control principle (current mode control principle). In this case, the coil L1 is used as current source in order to reduce dynamics in the feedback. The control logic sets a current reference due to the utilization of the control signal PWM. The control and the feedback follow this reference cycle after cycle.

The control signal PWM, which can be transmitted via the control output D1_T1, is generated by means of the pulse-width modulator MOD. However, other signal-generating means would also be conceivable. In this embodiment example, the pulse-width modulator MOD is supplied with a clock signal CLK. In addition, the comparison signal of the second comparator COMP2, which can be used for adapting the control signal PWM in dependence on the feedback signal FB and the current signal I_sense, is fed to the pulse-width modulator MOD.

The current signal I_sense is measured in the form of a voltage drop across the precision resistor Rsense with the aid of the operational amplifier OPAMP. The resulting current signal I_sense and the saw-tooth signal SAW are added, wherein the summing unit Σ is used for this purpose. Subsequently, the current signal is made available at the second comparator COMP2. In addition, the current signal I_sense is also fed to the first comparator COMP1 which, in a manner of speaking, represents a safety component that can indicate a high-current situation at the converter die D2 to the pulse-width modulation. This component is optional.

The transconductance amplifier OTA compares the feedback signal FB to the reference Vref. The thusly compared feedback signal FB is fed to the other input of the second comparator COMP2 in the form of an error signal. C1, C2 and R1 are used and adjusted in order to compensate the output of the transconductance amplifier OTA.

The second comparator COMP2 compares the feedback signal FB and the summed current signal I_sense in order to respectively generate a corresponding output signal or the comparison signal. In this embodiment, the comparison signal of the second comparator COMP2 particularly is also a pulse-width modulated signal. The pulse-width modulator generates the control signal PWM from the comparison signal of the second comparator COMP2 and the clock signal CLK. The switches SW1, SW2 open and close in accordance with the modulated control signal PWM. In this way, a duty factor or duty cycle of the converter die D2 is defined and transmitted to the DC/DC converter DCDC1 via the single-line interface INT1.

Figure 3:
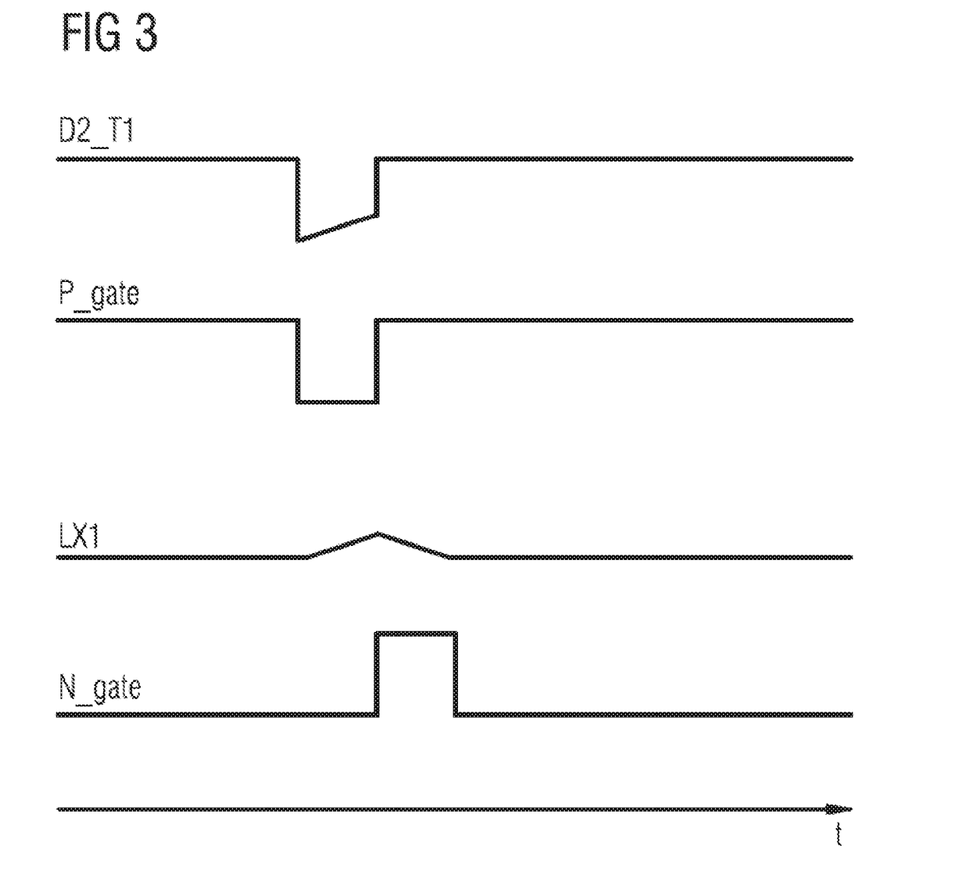
FIG. 3 shows an example flowchart of a converter arrangement according to the proposed principle.

The mode of operation of the converter die D2 can be further elucidated with reference to FIG. 3. FIG. 3 shows an exemplary embodiment of a flow chart of a converter arrangement according to the proposed principle. The drawing shows characteristic signals that are fed to the control output D2_T1, to the p-gate and the n-gate, as well as to the inductance terminal LX1, as a function of the time t.

The control signal PWM is transmitted from the control output D1_T1 to the control input D2_T1. At the control input D2_T1 of the converter die D2, the control signal PWM is measured by means of the buffer BUF that in the present embodiment represents a Schmitt trigger. The buffer BUF generates a PGATE signal that is synchronous with the control signal PWM (see signals at the control output D2_T1 and the p-gate in the drawing) in dependence on the control signal PWM. The PGATE signal causes the p-gate to open or close the switch SW4. If the switch SW4 is opened, the current flowing through the coil L1 simultaneously increases, as indicated in the drawing, in the form of a signal rise at the inductance input LX1 (see signal at LX1 in the drawing).

Due to the feedback and control (see above), the control signal PWM is dynamically adapted. This is indicated in the drawing in the form of a signal rise at the control output D2_T1.

When the PGATE signal is deactivated, the switch SW4 is closed and an NGATE signal is simultaneously activated by means of the converter control logic CCL. The NGATE signal causes the n-gate to open or close the switch SW3. If the switch SW3 is closed, the current flowing through the coil L1 simultaneously decreases, as indicated in the drawing, in the form of a signal decay at the inductance terminal LX1 (see signal at LX1 in the drawing). If the current flowing through the coil L1 is almost zero while the NGATE signal is activated, the (optional) zero comparator Zcomp deactivates the NGATE signal (ideal diode operation) and a new cycle is started.

While the PGATE signal is activated, the coil current is measured and the current source I is used for transmitting a corresponding current signal I_sense to the control die D1 by means of the single-line interface INT1. This information is used for the control logic, for example, in order to realize a current mode DC/DC converter.

Figure 4:
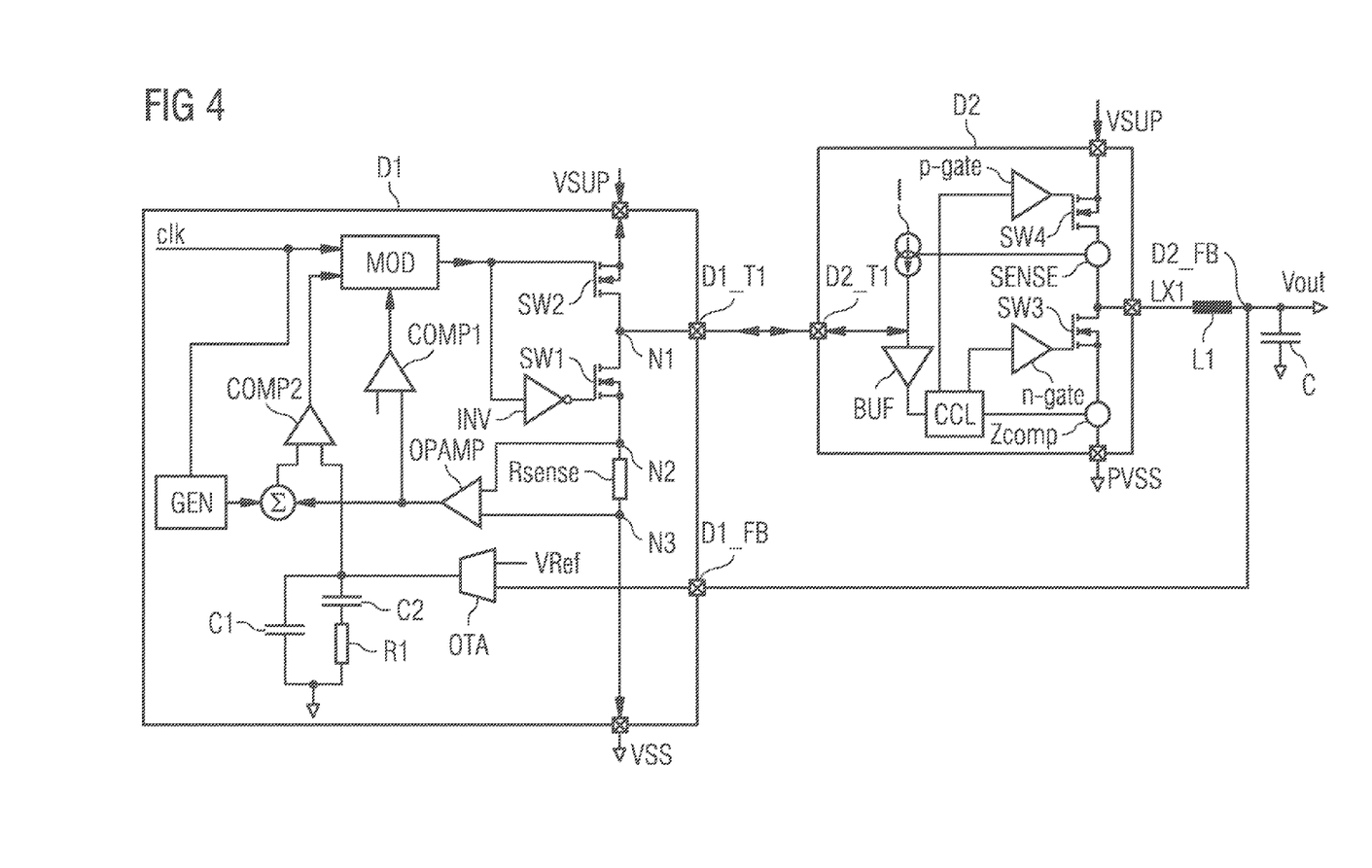
FIG. 4 shows another embodiment example of a converter arrangement according to the proposed principle.

FIG. 4 shows another embodiment example of a converter arrangement according to the proposed principle. The implementation shown is based on the arrangement described with reference to FIG. 2. However, the measurement of the current signal I_sense is implemented differently.

In this case, the precision resistor Rsense is coupled between the second node N2 and a third node N3 that is connected to the supply input VSS. The second comparator COMP2 is respectively connected to the second and the third nodes N3, N2 with its input side. In this way, the current signal I_sense is merely measured in the form of a voltage drop across the precision resistor Rsense. In contrast to the implementation according to FIG. 2, the current signal I_sense is, in a manner of speaking, decoupled, and the transistor SW1 is not involved.

Figure 5:
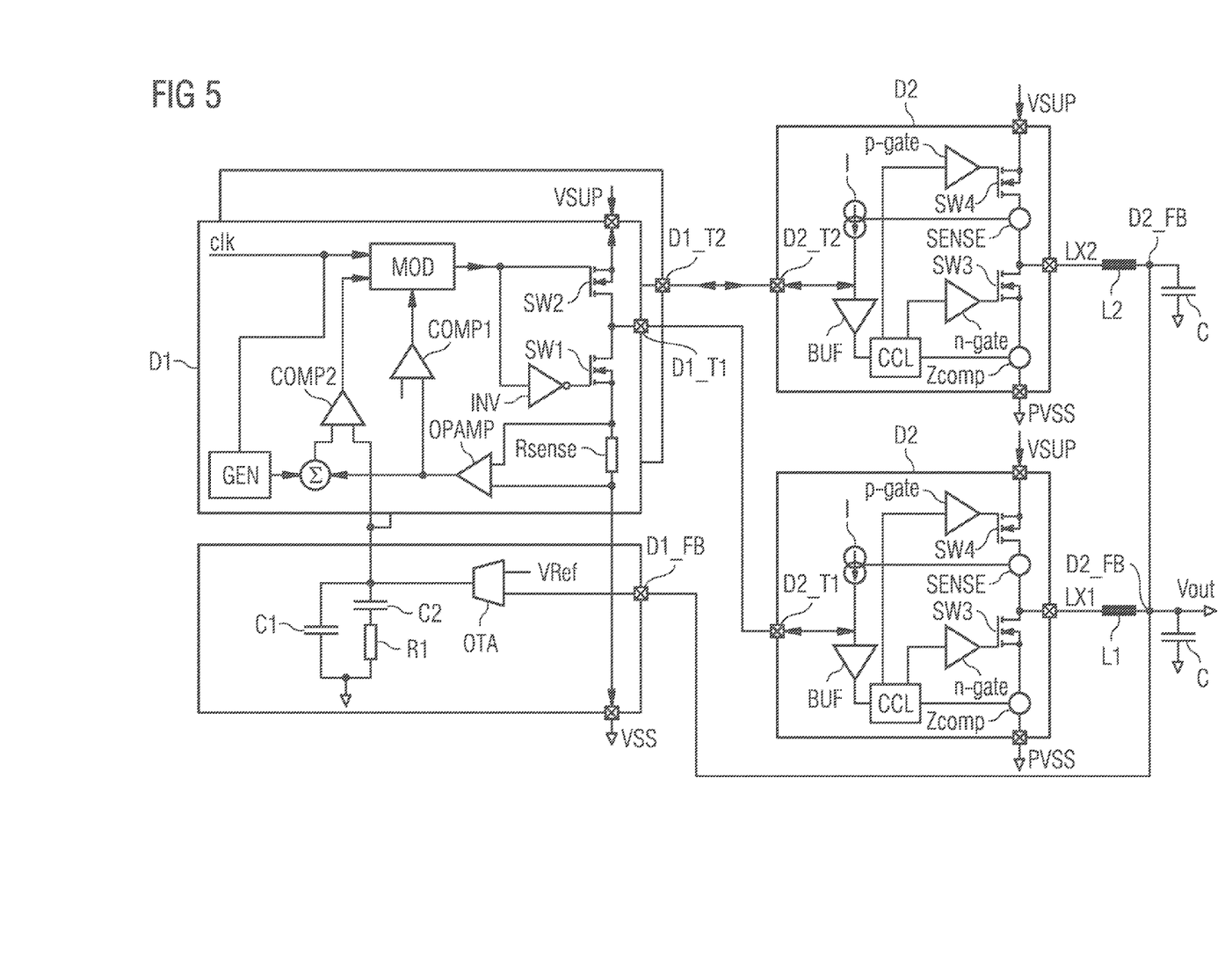
FIG. 5 shows an embodiment example of a multi-phase converter arrangement according to the proposed principle.

FIG. 5 shows an embodiment example of a multi-phase converter according to the proposed principle. This implementation is based on the embodiment example illustrated in FIG. 4. However, the control die and the converter die D1, D2 comprise additional components in this case.

The control die D1 has a plurality of control logics that are realized as discussed above and integrated into a common semiconductor body. These components jointly form a multi-phase converter arrangement, wherein each control logic defines a corresponding phase. In this concrete embodiment, the control logics respectively share the control and feedback paths. However, it is also possible to provide separate feedback paths for each of the corresponding control logics or to respectively provide a few control logics with a corresponding feedback path, etc.

The converter die D2 essentially corresponds to the converter die discussed in connection with FIG. 2. However, the converter die comprises a plurality of converters that are indicated in the form of boxes in the drawing. These converters may likewise be integrated into a common semiconductor body or alternatively into respective or partially separate semiconductor bodies. As indicated in FIG. 5, they may be connected via respective feedback outputs D2_FB. In this way, all converters make available a common output signal Vout. In an alternative embodiment that is not illustrated in the figures, each converter may also make available a different output signal.

The proposed implementation allows a flexible adaptation of the converter arrangement for power management purposes. The number of phases can largely be chosen arbitrarily and adapted to the respective task. High currents can therefore be realized on different power supplies.

Figure 6:
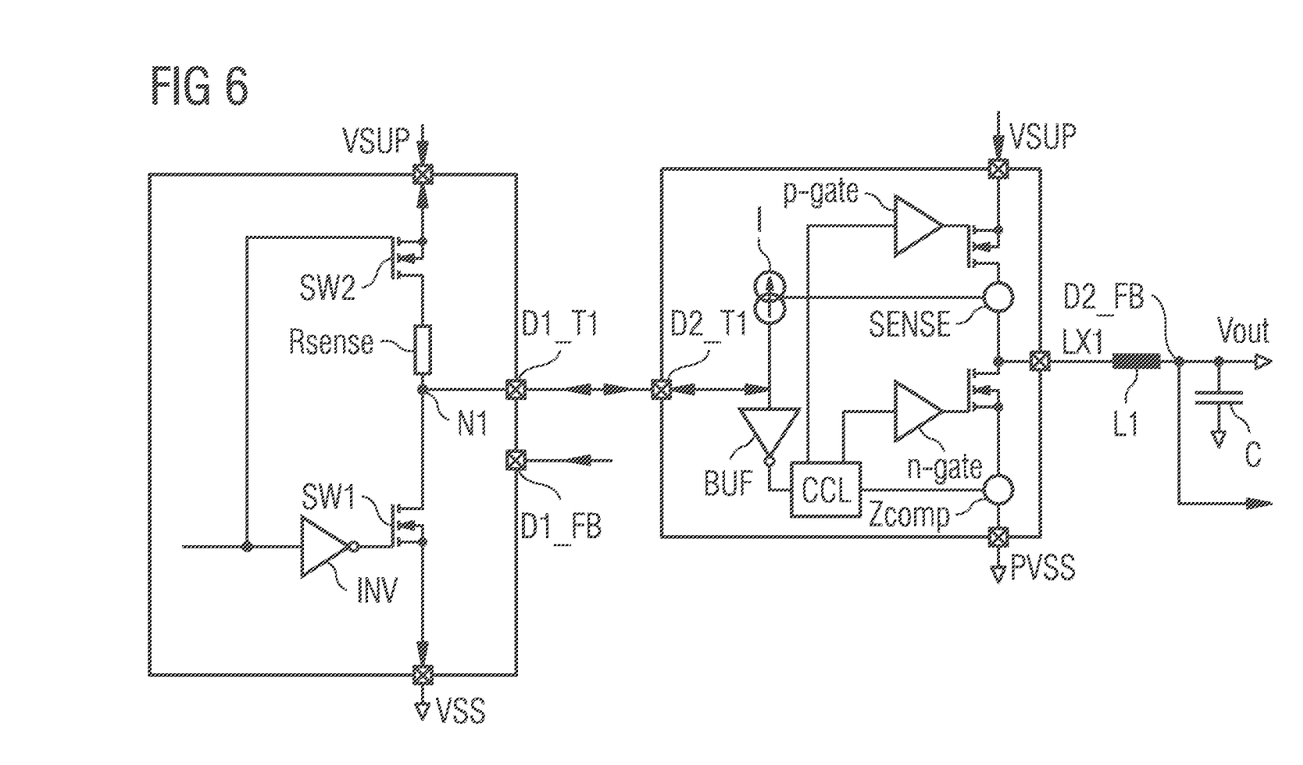
FIG. 6 shows an embodiment example of an inverting converter arrangement according to the proposed principle.

FIG. 6 shows an embodiment example of an inverting converter arrangement according to the proposed principle. The implementation shown is based on the concept presented with reference to FIG. 2. In this simplified drawing, only a few components of the control die D1 are shown in order to better highlight the differences.

In this case, the precision resistor Rsense is connected to the first node N1 and the first switch SW1 rather than to the second switch SW2. This results in an inverted control signal PWM being fed to the control input D1_T1 (see FIG. 7), and therefore represents an alternative implementation.

Figure 7:
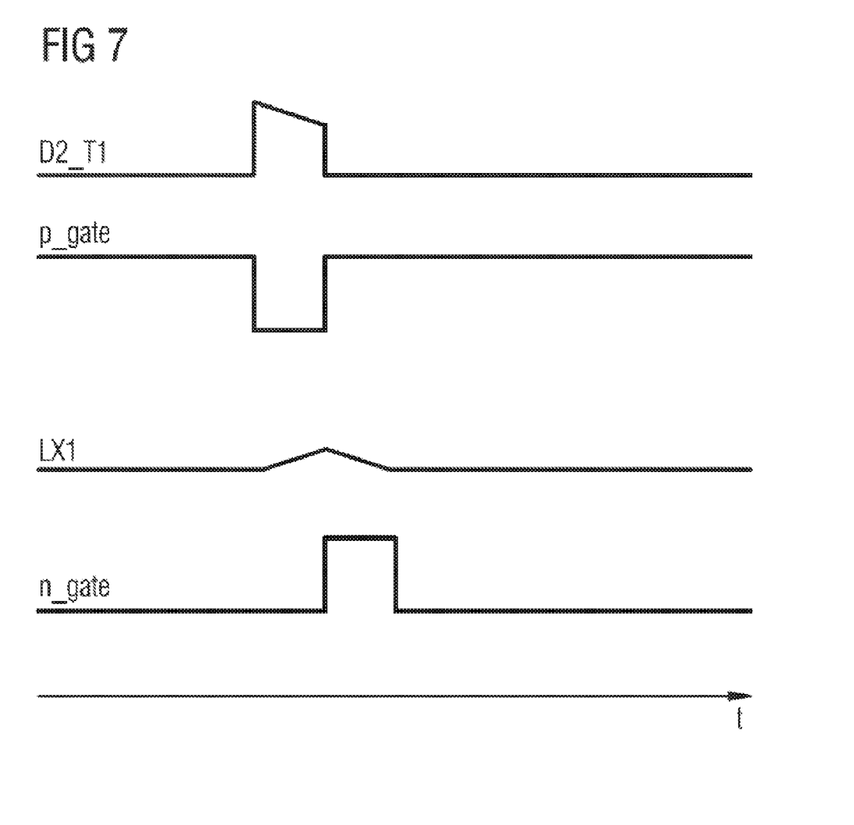
FIG. 7 shows an embodiment example of a converter arrangement according to FIG. 6.

FIG. 7 shows a corresponding example flowchart of a converter arrangement according to FIG. 6.

Figure 8:
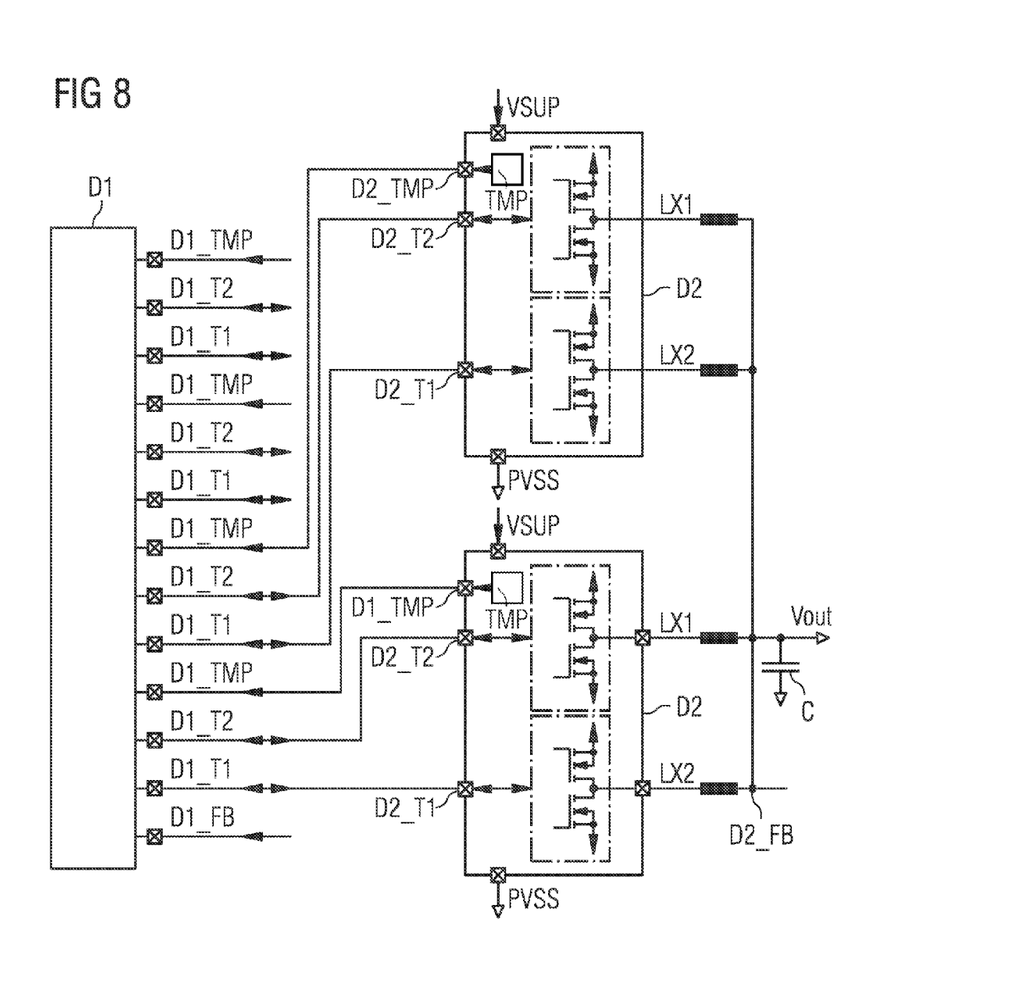
FIG. 8 shows an embodiment example of another multi-phase converter arrangement according to the proposed principle.

FIG. 8 shows an embodiment example of another multi-phase converter arrangement according to the proposed principle. In this special example, the control die D1 comprises a control logic that is capable of operating eight phases, i.e. eight DC/DC converters that form part of one or more converter dies D2. However, only four DC/DC converters are illustrated in the figure. The control die D1 features a corresponding number of control outputs D1_T1, D1_T2 and temperature inputs D1_TMP. In addition, a common feedback input D1_FB is provided in this case. Temperature sensors TMP are connected to the temperature outputs D2_TMP, respectively.

Accordingly, the converter die or the plurality of converter dies D2 feature/s a corresponding number of control outputs D2_T1, D2_T2 and temperature outputs D2_TMP. The feedback outputs D2_FB connect the inductance terminals LX1, LX2 and are coupled to the common feedback input D1_FB of the control die D1.

We claim:

1. A converter arrangement, particularly a switched DC/DC converter arrangement, comprising:
   a control die that comprises a control logic for generating a control signal and further comprises a control output for controlling a converter die by means of the control signal,
   the converter die that comprises at least one converter and is designed for converting an input signal into an output signal in dependence on the control signal, wherein the control signal can be received at a control input, and
   a single-line interface that connects the control output to the control input,
   wherein the control die features a temperature input,
   wherein the converter die features a temperature output,
   wherein a second single-line interface connects the temperature input to the temperature output, and
   wherein a bidirectional communication is designed for transmitting the temperature signal from the temperature output to the temperature input, and for receiving a configuration signal from the temperature output at the temperature input.

2. The converter arrangement according to claim 1, wherein the single-line interface is designed for bidirectional communication between the control output and the control input.

3. The converter arrangement according to claim 2, wherein the bidirectional communication is designed
   for transmitting the control signal from the control output to the control input and
   for receiving a current signal from the control input at the control output, wherein the current signal is dependent on a coil current flowing through a coil that can be connected to the at least one converter.

4. The converter arrangement according to claim 3, wherein the control logic of the control die generates the control signal in dependence on the current signal.

5. The converter arrangement according to claim 1, wherein the converter die comprises:
   the at least one converter that features switches,
   a converter control logic that is connected to the control input and respectively connected to the switches via driver stages, and
   a current source that is connected to the control input and coupled to a current meter.

6. The converter arrangement according to claim 1, wherein the second single-line interface is designed for bidirectional communication between the temperature input and the temperature output.

7. The converter arrangement according to claim 1, wherein the converter die features means for generating a temperature signal, and wherein the temperature signal is dependent on the temperature of the converter die and made available at the temperature output.

8. The converter arrangement according to claim 1, wherein
   the control die comprises a plurality of control logics that respectively feature a control output and
   the converter die comprises a plurality of converters that respectively feature a control input.

9. The converter arrangement according to claim 8, wherein
   the plurality of control logics is integrated into a common semiconductor chip and
   the plurality of converters is integrated into another common semiconductor chip.

10. A converter arrangement, particularly a switched DC/DC converter arrangement, comprising:
    a control die that comprises a control logic for generating a control signal and further comprises a control output for controlling a converter die by means of the control signal,
    the converter die that comprises at least one converter and is designed for converting an input signal into an output signal in dependence on the control signal, wherein the control signal can be received at a control input, and
    a single-line interface that connects the control output to the control input,
    wherein the control die features a temperature input,
    wherein the converter die features a temperature output,
    wherein a second single-line interface connects the temperature input to the temperature output,
    wherein a bidirectional communication is designed for transmitting the temperature signal from the temperature output to the temperature input, and for receiving a configuration signal from the temperature output at the temperature input,
    wherein the control logic, in dependence on the configuration signal, switches the converter die on or off and/or makes available a bias current at the converter die.

11. The converter arrangement according to claim 1 or 10, wherein
    the control logic comprises a feedback input that is connected to a feedback output of the converter die by means of an interface which communicates in one direction only in order to receive a feedback signal, and
    the feedback signal is dependent on the output signal, and the control signal is dependent on the feedback signal.

12. The converter arrangement according to claim 11, wherein the control logic comprises a comparator that is coupled to the feedback input and designed for generating a comparison signal by comparing the current signal and the feedback signal.

13. The converter arrangement according to claim 12, wherein
    the control logic comprises a modulator for modulating the control signal by means of pulse-width modulation, wherein the pulse-width modulation is carried out in dependence on the comparison signal of the comparator and
    the modulated control signal defines a duty factor of the at least one converter.

14. The converter arrangement according to claim 11, wherein the plurality of control logics feature the same feedback input, wherein the feedback input is respectively connected to the feedback outputs of the plurality of converters.

15. A method for operating a converter arrangement, particularly for operating a switched DC/DC converter arrangement, comprising the steps of:
- generating a control signal by means of a control logic of a control die in order to control a converter die,
- transmitting the control signal by means of a first single-line interface that connects a control output of the control die to a control input of the converter die,
- receiving the control signal at the control input of the converter die, and
- converting an input signal into an output signal in dependence on the control signal by means of at least one converter of the converter die,
- wherein the control die features a temperature input,
- wherein the converter die features a temperature output,
- wherein a second single-line interface connects the temperature input to the temperature output, and
- wherein a bidirectional communication is designed for transmitting the temperature signal from the temperature output to the temperature input, and for receiving a configuration signal from the temperature output at the temperature input.

* * * * *